United States Patent [19]

Parker

[11] Patent Number: 4,583,612
[45] Date of Patent: Apr. 22, 1986

[54] ANTI-PITCH SYSTEM FOR A MOTORCYCLE

[76] Inventor: James G. Parker, 102 S. Capitol St., Santa Fe, N. Mex. 87501

[21] Appl. No.: 632,602

[22] Filed: Jul. 19, 1984

[51] Int. Cl.⁴ ........................ B62K 25/12; B60G 21/04
[52] U.S. Cl. .................................... 180/227; 280/275; 280/283
[58] Field of Search ................ 180/227; 280/275, 283; 267/57

[56] References Cited

U.S. PATENT DOCUMENTS

| | | | |
|---|---|---|---|
| 3,521,904 | 7/1970 | Sheffer | 280/283 X |
| 4,265,329 | 5/1981 | de Cortanze | 280/275 X |
| 4,398,741 | 8/1983 | Hiramatsu | 180/227 |
| 4,451,065 | 5/1984 | Williams | 180/227 |

*Primary Examiner*—John A. Pekar
*Attorney, Agent, or Firm*—William A. Eklund

[57] ABSTRACT

An anti-pitch system for a motorcycle having a rear swing arm suspension and a front suspension of the type including a control arm which is hinged to the chassis and which extends forwardly therefrom. The anti-pitch system includes a torsion rod which links the rear swing arm to the forward control arm. The torsion rod resists unequal angular displacements of the control arm and the swing arm relative to the chassis, thereby resisting pitching motions such as normally occur during hard braking of the front wheel or during hard acceleration. The torsion rod does not however affect substantially equal displacements of the front and rear suspensions, that is, substantially vertical motions of the motorcycle chassis, such as occur in response to varying weight loads on the motorcycle or in response to dips or rises in a road. The system is particularly adapted to a motorcycle having a one-sided front suspension system.

5 Claims, 3 Drawing Figures

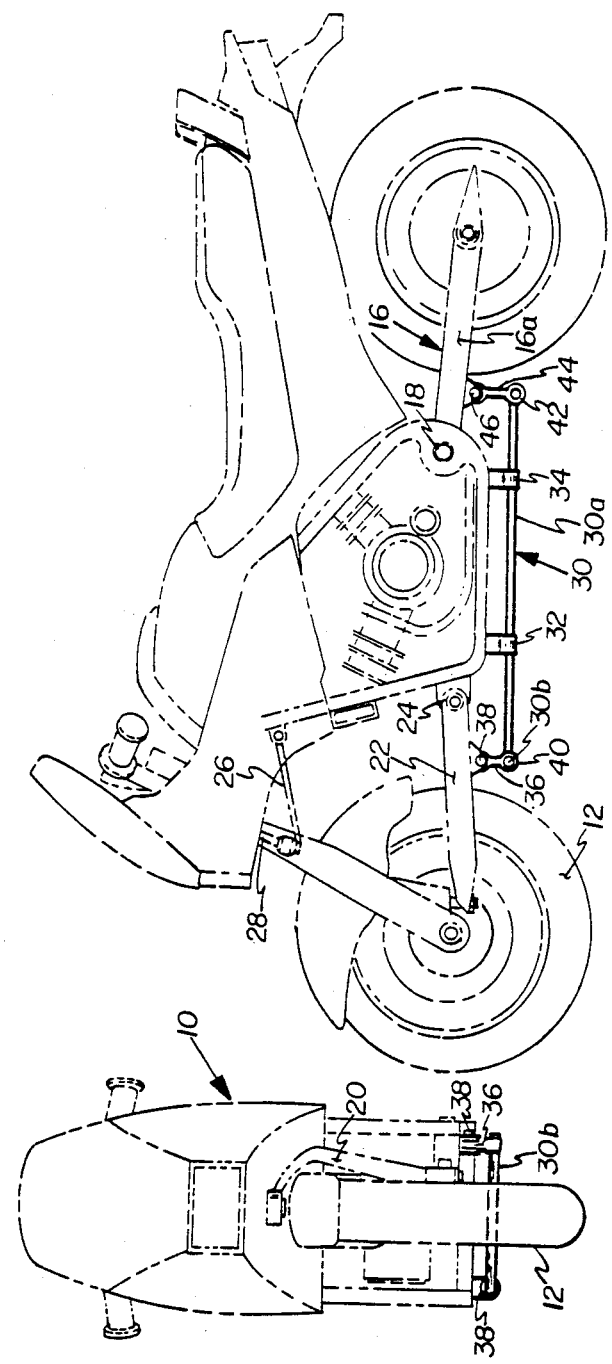

ANTI-PITCH SYSTEM FOR A MOTORCYCLE

BACKGROUND OF THE INVENTION

The invention disclosed herein is generally related to suspension and shock absorption systems for motorcycles. More particularly, this invention is directed to motorcycles having a one-sided suspension system for the front wheel of the motorcycle, such as is disclosed in the applicant's U.S. Pat. No. 4,526,249, issued July 2, 1985 and entitled Front Suspension System for a Motorcycle.

Many contemporary motorcycles include swing-arm rear suspension systems, in which the rear wheel is journalled to a swing arm, or U-shaped fork, which is hinged to the chassis of the motorcycle and which extends rearwardly from the chassis to the hub of the rear wheel.

In the above-referenced patent, there is disclosed a novel suspension for the front wheel of a motorcycle. The suspension is one-sided, in the sense that the front wheel is journalled to an axle shaft which extends in a cantilevered arrangement from a kingpin positioned along one side of the wheel. The kingpin is attached to upper and lower control arms which are hinged to the motorcycle chassis. In particular, the lower control arm is arcuately shaped and extends forwardly from the chassis around one side of the front wheel to the hub and kingpin assembly.

The present invention is directed to the problem of longitudinal pitching in motorcycle performance. As is well known, all motorcycles have a tendency to dive, or pitch forwardly and downwardly, during hard breaking of the front wheel. Complex anti-pitching mechanisms have been developed for motorcycles having conventional fork-tube front-end suspensions. Such mechanisms typically operate to increase the compression pressure in the front fork shock tubes during braking.

The reverse effect, upward pitching during hard acceleration of the motorcycle, is also well known. There have not been previously known mechanisms for reducing this type of pitching without impairing other aspects of the motorcycle performance.

Accordingly, it is the object and purpose of the present invention to provide a mechanism for reducing pitching in a motorcycle.

More particularly, it is the object of the present invention to provide a mechanism for reducing pitching in a motorcycle having a swing arm rear suspension and a one-sided parallelogram front suspension.

SUMMARY OF THE INVENTION

In accordance with the present invention, there is provided an anti-pitch system for a motorcycle having a rear swing arm suspension and a front suspension including a control arm which is hinged to the motorcycle chassis and which extends forwardly therefrom. The system is particularly adapted to motorcycles having a one-sided front suspension. The anti-pitch system comprises a torsion rod which is connected at one end to the swing arm of the rear suspension and which is connected at its opposite end to the control arm of the front suspension. Between the two ends, the torsion rod is rotatably affixed to the underside of the chassis. The torsion rod effectively links the rear swing arm and the front control arm so that angular displacement of one arm with respect to the chassis is tied to the same displacement of the other arm. Unequal angular displacements are absorbed and resisted by the torsional rigidity of the torsion rod. The torsion rod thus resists pitching motions in the motorcycle without resisting substantially vertical motions such as ordinarily occur in response to varying weight loads or in response to dips or rises in a road.

For example, during diving of the motorcycle upon hard braking, the upward motion of the front control arm (relative to the motorcycle chassis) acts through the torsion rod to drive the rear swing arm upwardly also, thereby effectively driving the rear end of the motorcycle chassis downwardly. Likewise, upward pitching of the motorcycle during hard acceleration is resisted by the torsion rod.

These and other aspects of the present invention will be more apparent upon consideration of the accompanying drawings and the following detailed description of the invention.

BRIEF DESCRIPTION OF THE DRAWINGS

The accompanying drawings are incorporated in and form a part of the specification. The drawings illustrate the best mode of the invention contemplated by the applicant and, together with the following description, serve to explain the structure and operation of the invention. In the drawings:

FIG. 2 is a side view of the motorcycle of FIG. 1; and

FIG. 3 is a front view in partial cross section of the motorcycle shown in FIG. 1.

DETAILED DESCRIPTION OF THE INVENTION

Figure 1:
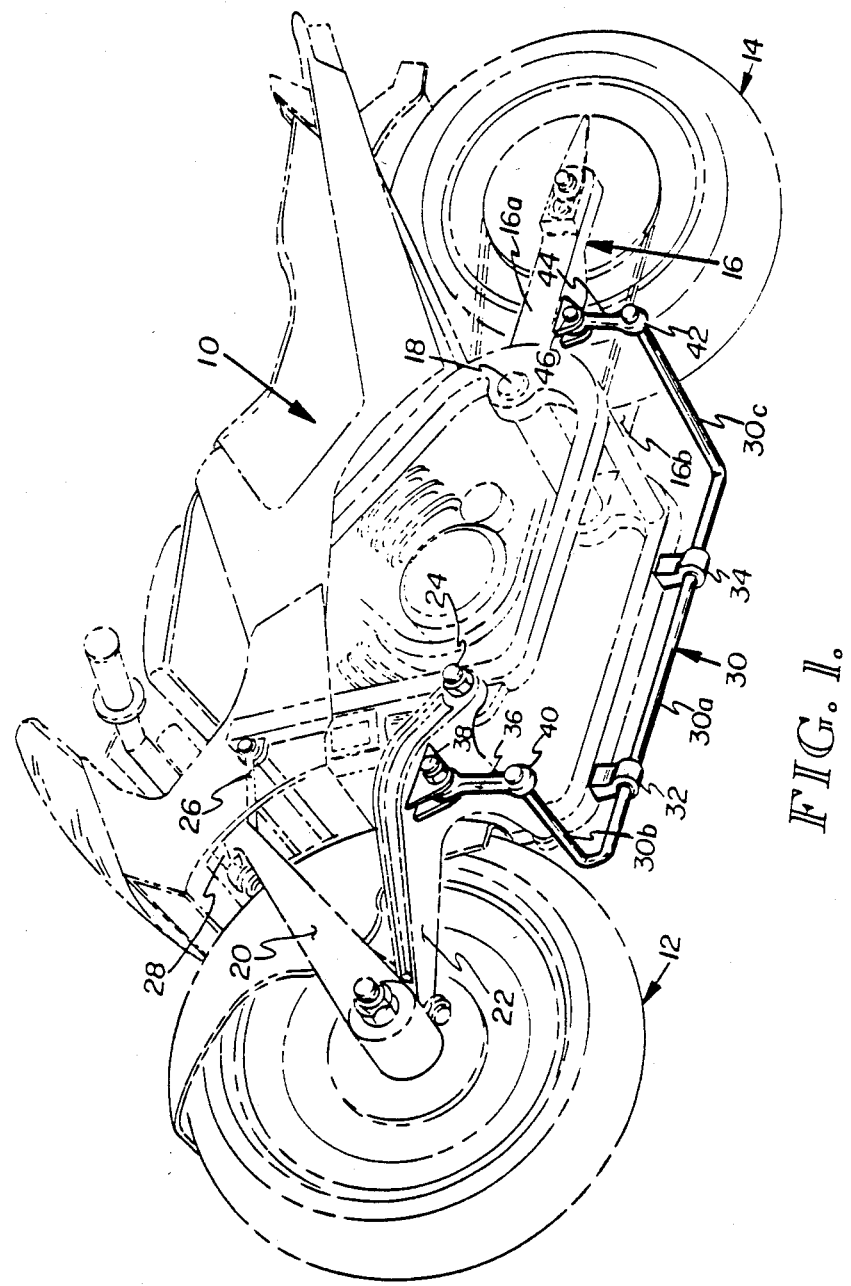
FIG. 1 is a pictorial view of a motorcycle provided with the anti-pitch mechanism of the present invention, and taken from below the front end of the motorcycle.

Referring to the Figures, there is illustrated a contemporary motorcycle provided with the anti-pitch mechanism of the present invention. Certain elements of the motorcycle are conventional and form no part of the present invention, yet are identified here for purposes of the following discussion. Briefly, the motorcycle includes a central chassis 10, which generally includes various motor and frame components, a front wheel 12, a rear wheel 14, and a U-shaped rear wheel swing arm 16. The swing arm 16 includes integral left and right arm members 16a and 16b respectively. The swing arm 16 is hinged to the chassis 10 by means of a bearing shaft 18.

The front suspension is constructed in accordance with the disclosure of the above-referenced U.S. Pat. No. 4,526,249, which is hereby incorporated by reference. Briefly, the front suspension system including a kingpin 20, on arcuate lower control arm 22 which is hinged to the chassis by means of a bearing shaft 24, an upper control arm 26 which is also hinged to the chassis, and a telescoping column 28. The kingpin 20 is connected by universal joints (not shown) to the forward ends of the upper and lower control arms 22 and 26.

The anti-pitch mechanism includes a torsion rod 30 which is oriented generally longitudinally with respect to the motorcycle. The torsion rod 30 may be described as being C-shaped, including a longitudinal center section 30a, a forward transverse section 30b, and a rear transverse section 30c.

The center section 30a is offset to the right side of the center plane of the motorcycle, meaning the vertical plane which is centered on the wheels of the motorcycle. It will be noted that the torsion rod center section 30a is positioned on the opposite side from the lower control arm 22. The center section of the torsion rod is affixed to the underside of the chassis 10 by means of spaced bushings 32 and 34 which allow the center section of the torsion rod to rotate about its longitudinal axis.

The forward transverse section 30a of the torsion rod extends across the center plane of the motorcycle and terminates at a point which is below the lower control arm 22 of the front suspension, forward of the control arm bearing shaft 24, and rearward of the front wheel 12. The end of the transverse section 30a is connected to the lower control arm by means of a short connecting rod 36. The connecting rod 36 is pivotably connected to the underside of the control arm 22 by means of a pivot pin 38, and is connected to the end of the transverse torsion rod section 30b by a rubber bushing 40.

The rear transverse section 30b of the torsion rod 30 is likewise connected to the left arm member 16a of the rear swing arm 16. More particularly, the transverse section 30b extends across the center plane of the motorcycle and is connected by means of a rubber bushing 42 to the lower end of a short connecting rod 44. The upper end of the connecting rod 44 is pivotably connected by means of a pivot pin 46 to the underside of the swing arm member 16a, at a point rearward of the swing arm bearing shaft 18 and forward of the rear wheel 14.

In operation, vertical swinging motion of the front suspension system, specifically the lower control arm 22, is mechanically tied to corresponding vertical swinging motion of the rear swing arm 16. The torsion rod 30 offers no resistance to swinging motion of these elements, so long as the individual angular displacements are of the same magnitude and in the same direction. Thus, the torsion rod has no effect upon the ordinary responses of the front and rear suspension systems to varying weight loads on the motorcycle. Similarly, the torsion rod has a negligible effect on dynamic vertical motions which occur in response, for example, to dips or rises in a road, and thus has little effect on the ride of the motorcycle under most circumstances.

However, the torsion rod does offer resistance to pitching motions, in which the motorcycle rotates about an axis transverse to the center plane of the motorcycle. In the course of such motion the angular displacements of the rear swing arm and the lower control arm, relative to the chassis, are unequal and are thus resisted by the torsion rod. For example, during hard braking of the front wheel there is a normal tendency for the motorcycle to pitch forward, or dive. In the absence of the torsion rod, this would normally result in the lower control arm 22 swinging upward relative to the chassis 10, and the rear swing arm 16 swinging downward with respect to the chassis. However, with the torsion rod 30 linking the control arm and the swing arm in the manner described above, any such opposite swinging motions must be borne by twisting of the center section 30a of the torsion rod, and are thus resisted by the natural rigidity of the torsion rod.

Likewise, during hard acceleration there is a tendency for the motorcycle to pitch upwardly, with the lower control arm 22 swinging downwardly and the rear swing arm 16 swinging upwardly with respect to the chassis. Since these swinging motions are in opposite directions, they are absorbed by twisting of the center section 30a of the torsion rod, and are consequently resisted by the rigidity of the torsion rod.

It will be recognized that the present invention is of particularly useful application to motorcycles having a one-sided front suspension system, in which the front wheel swings on the upper and lower control arms in a manner similar to the function of the rear swing arm. Although it has been previously known to use torsion rods, for example, in automobiles where to the rod typically extends transversely across the front end suspension system to link independently suspended front wheels, there is not known to be any previous application of the use torsion rods in motorcycle suspensions which has been considered desirable or feasible.

Although the present invention is described and illustrated here with reference to a preferred embodiment, it will be understood that various modifications, substitutions and alterations may be made without departing from the essential invention. For example, although the present invention is particularly adapted to a motorcycle having a one-sided front suspension as described above, the invention is also applicable to motorcycles having other types of front suspensions which include either one or two forwardly extending control arms. Accordingly, the scope of the invention is defined by the following claims.

What is claimed is:

1. In a motorcycle having a central chassis and a front wheel, and a rear swing arm suspension including a swing arm, and a one-sided front suspension including a control arm which is hinged to the chassis and which extends forwardly from the chassis around one side of the front wheel of the motorcycle, an anti-pitch system comprising a torsion rod connecting said control arm of said front suspension and said swing arm of said rear suspension, whereby unequal angular displacements of said control arm and said swing arm are resisted by torsional rigidity of said torsion rod.

2. The anti-pitch system defined in claim 1 wherein said torsion rod includes a longitudinal center section and transversely extending forward and rear sections, said center section being rotatably affixed to the underside of said chassis, and wherein said forward and rear transverse sections are pivotably connected respectively to said control arm and said swing arm.

3. The anti-pitch system defined in claim 2 as particularly adapted to a motorcycle having a one-sided front suspension system which includes an arcuate control arm that extends forwardly from the chassis around one side of the front wheel of the motorcycle, and wherein the motorcycle includes a longitudinal vertical center plane, said center section of said torsion rod being offset to one side of said center plane, and with said one side being the side of the center plane opposite from that of the front control arm of the front suspension system.

4. The anti-pitch system defined in claim 3 wherein said forward and rear transverse sections of said torsion rod extend across said center plane and are connected to first and second connecting rods which extend downwardly from said control arm and said swing arm, respectively.

5. The anti-pitch system defined in claim 4 wherein said first connecting rod is pivotably connected to said control arm at a point rearward of the front wheel of the motorcycle and forward of the hinged end of the control arm, and wherein said second connecting rod is pivotably connected to said swing arm at a point forward of the rear wheel of the motorcycle and rearward of the hinged end of the swing arm.

* * * * *